(12) United States Patent
van Veen et al.

(10) Patent No.: US 7,613,256 B2
(45) Date of Patent: Nov. 3, 2009

(54) FORWARD ERROR CORRECTION IN A DISTRIBUTION SYSTEM

(75) Inventors: Durk L. van Veen, Santee, CA (US); Jai N. Subrahmanyam, San Diego, CA (US); Jinxia Bai, San Diego, CA (US); Murali Ramaswamy Chari, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 574 days.

(21) Appl. No.: 11/398,204

(22) Filed: Apr. 4, 2006

(65) Prior Publication Data

US 2007/0230627 A1    Oct. 4, 2007

(51) Int. Cl.
*H04L 27/06* (2006.01)

(52) U.S. Cl. .................. 375/340; 714/752; 714/753; 714/754; 714/755; 714/756; 714/757; 714/758

(58) Field of Classification Search ......... 714/752–758, 714/783–804; 375/340
See application file for complete search history.

(56) References Cited

U.S. PATENT DOCUMENTS

| | | | | |
|---|---|---|---|---|
| 4,144,522 A | * | 3/1979 | Kageyama et al. | 714/748 |
| 4,723,243 A | * | 2/1988 | Joshi et al. | 714/776 |
| 5,805,612 A | * | 9/1998 | Newberg et al. | 714/746 |
| 5,832,036 A | | 11/1998 | Nakamura | |
| 5,951,707 A | * | 9/1999 | Christensen et al. | 714/752 |
| 6,487,185 B1 | * | 11/2002 | Burton | 370/332 |
| 2005/0272434 A1 | * | 12/2005 | Choi | 455/450 |

FOREIGN PATENT DOCUMENTS

| | | |
|---|---|---|
| WO | 97/24829 A1 | 7/1997 |
| WO | 2005/027396 A1 | 3/2005 |

* cited by examiner

*Primary Examiner*—Curtis B Odom
(74) *Attorney, Agent, or Firm*—Gerald P. Joyce, III

(57) ABSTRACT

A multimedia distribution system is disclosed. The distribution system includes a transmitter unit that distributes content from a content provider to one or more wireless subscriber units. The transmitter unit includes a decoder configured to determine whether a plurality of incoming packets include one or more erasures, a transmitter configured to transmit the packets to a receiving unit, and an error detection code generator configured to generate an error detection code for each of the packets transmitted to the receiver unit, the error detection code being modified for each of the erased packets so that the receiver unit will be able to identify the erased packets.

28 Claims, 5 Drawing Sheets

FORWARD ERROR CORRECTION IN A DISTRIBUTION SYSTEM

BACKGROUND

1. Field

The present disclosure relates generally to telecommunications, and more particularly, to forward error correction in a distribution system.

2. Background

In telecommunications, information is transmitted over a communications channel between a transmitter and receiver. This channel is a non-ideal, bandwidth limited path which imposes limits on the amount of information that can be transmitted reliably. These limits together with other properties of the channel, such as noise and interference, often cause errors in the transmitted information.

A number of techniques have been utilized in the past to deal with the effects of a non-ideal communications channel. Some of these techniques include various forms of forward error correction (FEC). FEC is a signal processing technique that adds redundancy to the transmitted information using a predetermined algorithm. The added redundancy allows the receiver to detect and possibly correct errors in the transmitted information.

The two major types of FEC are block coding and convolutional coding. Block coding works on a block of information to produce a codeword that is transmitted to the receiver. The receiver processes the received codeword in order to retrieve the block of information. Various operations may be performed to identify and correct errors. Convolution coding, on the other hand, works by encoding each bit of information based upon the bits that preceded it to produce a stream of code symbols. In the receiver, a convolutional decoder estimates the mostly likely bit sequence that produced the code symbol stream transmitted over the channel.

The most recent development in FEC is turbo coding. Turbo coding is a powerful FEC technique that uses two parallel convolutional encoders and an interleaver to produce a stream of code symbols. Typically, a block of bits with an error detection code is provided to a turbo encoder, resulting in a turbo encoded packet containing multiple code symbols. The error detection code may be parity bits, a checksum, a cyclic redundancy check (CRC) code, or the like. These error detection codes are used by an iterative turbo decoder in the receiver to determine if the turbo encoded packet is successfully decoded during the initial iterations, and if so, terminate the decoding process early.

Turbo codes and block codes are frequently combined in concatenated coding schemes to provide more powerful error correction capability. In these coding schemes, the turbo codes are used to initially decode the information and the block codes are used to correct any errors that remain. To the extent that the turbo codes are able to correct all the errors, the block decoding process can be disabled.

The various FEC techniques described thus far have certain limitations. In particular, these techniques are extremely efficient in correcting errors introduced in the communications channel between the transmitter and receiver, but do not account for errors that might exist in the information prior to encoding at the transmitter. This situation is most likely to exist in a distribution system where the transmitter is used to distribute information from a content source to one or more receivers. In this configuration, information may be lost or corrupted during transmission between the content provider and the transmitter, and not detectable by the FEC implemented between the transmitter and receiver. This may be especially problematic when the information from the content source includes its own FEC, which could be disabled at the receiver unless the receiver is made aware that the information is corrupted.

SUMMARY

One aspect of a transmitter unit includes a decoder configured to determine whether a plurality of incoming packets include one or more erasures, a transmitter configured to transmit the packets to a receiving unit, and an error detection code generator configured to generate an error detection code for each of the packets transmitted to the receiver unit, the error detection code being modified for each of the erased packets so that the receiver unit will be able to identify the erased packets.

Another aspect of a transmitter unit includes a decoder configured to receive multiple channels of packets comprising multimedia content from a content provider, the decoder being further configured to determine whether the packets include one or more erasures, a transmitter configured to transmit to each of a plurality of wireless subscribers units one or more of the channels of packets comprising multimedia content, and an error detection code generator configured to generate an error detection code for each of the packets transmitted to the wireless subscriber units, the error detection code being modified for the erased packets so that the wireless subscriber units receiving one or more of the erased packets will be able to identify them as erased packets.

One aspect of a method of transmitting packets to a receiving unit includes determining whether a plurality of incoming packets include one or more erasures, generating an error detection code for each of the packets, the error detection code being modified for each of the erased packets so that the receiver unit will be able to identify the erased packets, and transmitting the packets to the receiving unit.

A further aspect of a transmitter unit includes means for determining whether a plurality of incoming packets include one or more erasures, means for transmitting the packets to a receiving unit, and means for generating an error detection code for each of the packets transmitted to the receiver unit, the error detection code being modified for each of the erased packets so that the receiver unit will be able to identify the erased packets.

An aspect of computer readable storage media performs a method of transmitting packets to a receiving unit. the computer readable storage media contains a set of instructions for a processor, the set of instructions including a routine to determine whether a plurality of incoming packets include one or more erasures, and a routine to generate an error detection code for each of the packets before being transmitted to the receiving unit, the error detection code being modified for each of the erased packets so that the receiver unit will be able to identify the erased packets.

It is understood that other embodiments of the present invention will become readily apparent to those skilled in the art from the following detailed description, wherein it is shown and described only various embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Various aspects of a communications system are illustrated by way of example, and not by way of limitation, in the accompanying drawing, wherein.

DETAILED DESCRIPTION

The detailed description set forth below in connection with the appended drawings is intended as a description of various embodiments of the invention and is not intended to represent the only embodiments in which the invention may be practiced. The detailed description includes specific details for the purpose of providing a thorough understanding of the invention. However, it will be apparent to those skilled in the art that the invention may be practiced without these specific details. In some instances, well known structures and components are shown in block diagram form in order to avoid obscuring the concepts of the invention.

In the following detailed description, various FEC techniques will be described in the context of a multimedia distribution system in which a transmitting unit distributes multimedia content from a content source to one or more wireless subscriber units. In this system, the transmitting unit receives packets from a content source that are protected by block codes. The transmitting unit adds error detection codes to the packet stream and then encodes the packet stream with an FEC code. The error detection code is modified for each packet that is either lost or corrupted in transit between the content source and the transmitter unit so that the wireless subscriber units detect an error. This prevents the block decoding function at the wireless subscriber units from being prematurely disabled. While these techniques are well suited for use multimedia applications, those skilled in the art will readily appreciate that these techniques may be applied to any distribution system. Accordingly, any reference to a multimedia distribution system is intended only to illustrate various inventive aspects of the present invention, with the understanding that these inventive aspects have a wide range of applications.

Figure 1:
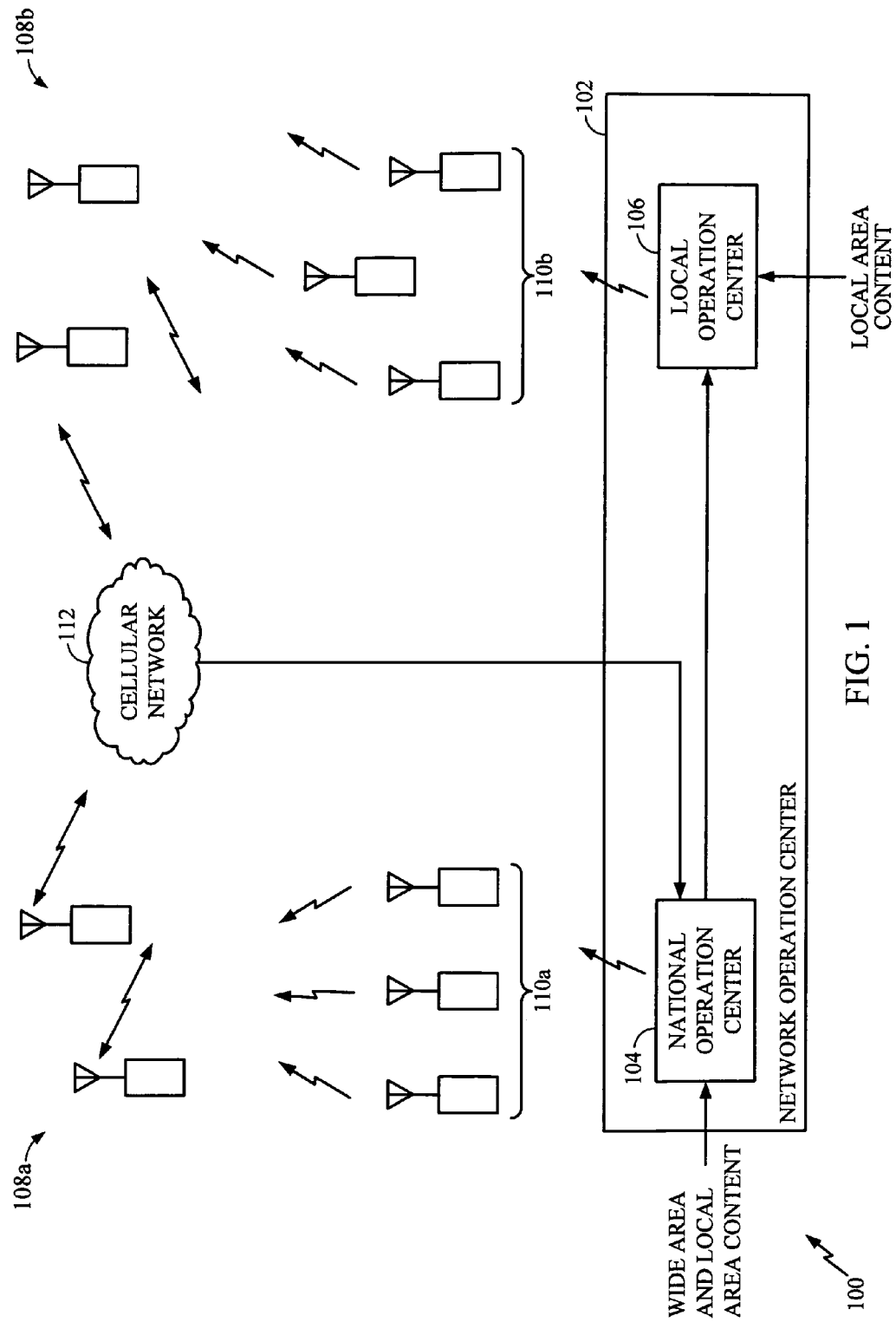
FIG. 1 is a conceptual block diagram illustrating an example of a multimedia distribution system.

FIG. 1 is a conceptual block diagram illustrating an example of a multimedia distribution system. The distribution system 100 is shown with a Network Operation Center (NOC) 102 which includes a national operation center 104 and one or more local operation centers, a single local operations center 106 is shown in FIG. 1. The national operation center 104 manages the NOC 102 and serves as an access point for national and local content providers to distribute wide area content to a large number of wireless subscriber units. In some geographic regions, the wide area content is distributed directly to wireless subscriber units 108a by the national operation center 104 through a network of transmitter units 110a. In more densely populated regions, one of the local operation centers 106 may be used to distribute wide area content to wireless subscriber units 108b through a network of transmitter units 110b serving that region. The local operation center 106 may also serve as an access point from which local content providers can distribute local content to the wireless subscriber units 108b in the associated market area.

The wireless subscriber units 108a, 108b may be any combination of cellular telephones, laptop computers, personal digital assistants (PDAs), game consoles, or other devices capable of receiving wide area and local area content. In the case of a cellular telephone, a cellular network 112 may be used by the national operations center 104 to manage user service subscriptions, and deliver to the cellular telephones access and encryption keys.

Figure 2:
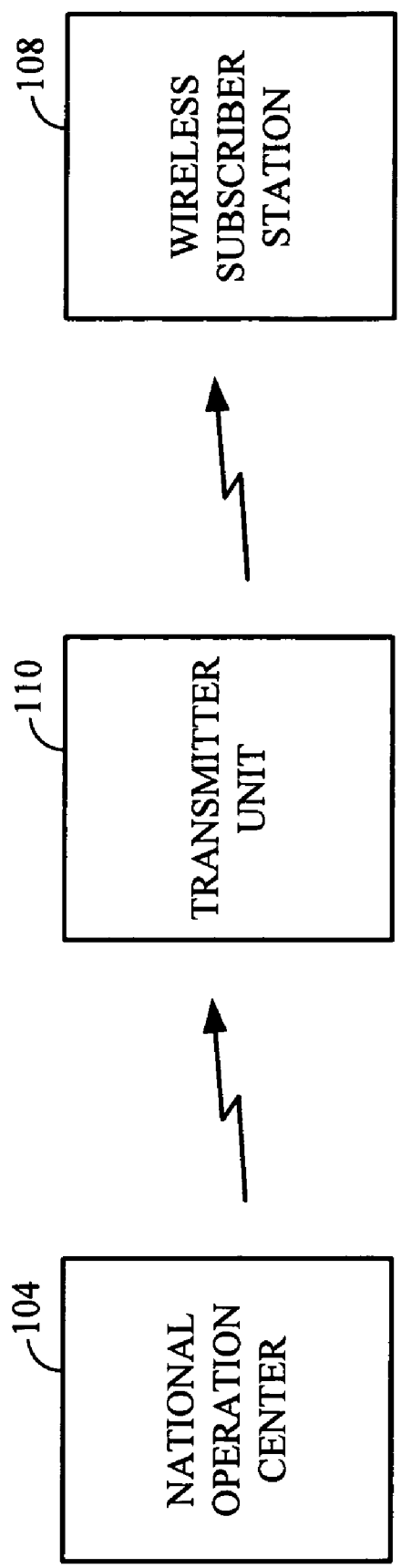
FIG. 2 is a conceptual block diagram illustrating a national operation center, a transmitter unit, and wireless subscriber unit.

FIG. 2 is a conceptual block diagram illustrating a national operation center, a transmitter unit, and wireless subscriber unit. As discussed above, the national operation center 104 receives wide area content from national and local content providers. This content is multiplexed onto one or more physical channels for distribution to the local operation centers in the NOC and the various transmitter units that receive content directly from the national operation center 104. The latter case will be described in connection with FIG. 2, with the understanding that the following concepts may be extended to the local operation centers. In the case of a local operation center, the content provided by the national operation center 104 may be treated as an input from another content provider.

Referring to FIG. 2, the content to be delivered to the transmitter unit 110 may be compressed using a compression standard to produce a content packet stream suitable for delivery to the wireless subscriber unit 108, such as H.264 or derivations thereof. H.264 is an advanced video compression standard standardized by ITU and ISO/IEC and is well known in the art. The specific compression standard selected for any particular application is well within the capabilities of one skilled in the art.

The content packet stream may be protected by a block code to provide FEC at the wireless subscriber unit 108. The block code works by placing a block of packets into a matrix and multiplying this by another matrix known to both the national operations center 104 and the wireless subscriber unit 108. The matrix multiplication results in a parity block that is appended to the block of packets prior to transmission. At the wireless subscriber unit 108, the same block of packets is loaded into an identical matrix, multiplied by the known matrix, and the results compared with the received codeword. If there are differences, various matrix operations may be performed in an attempt to correct the error. Any suitable block code may be used to protect the content packet stream including Reed-Solomon, BCH, Hamming, or the like.

Figure 3:
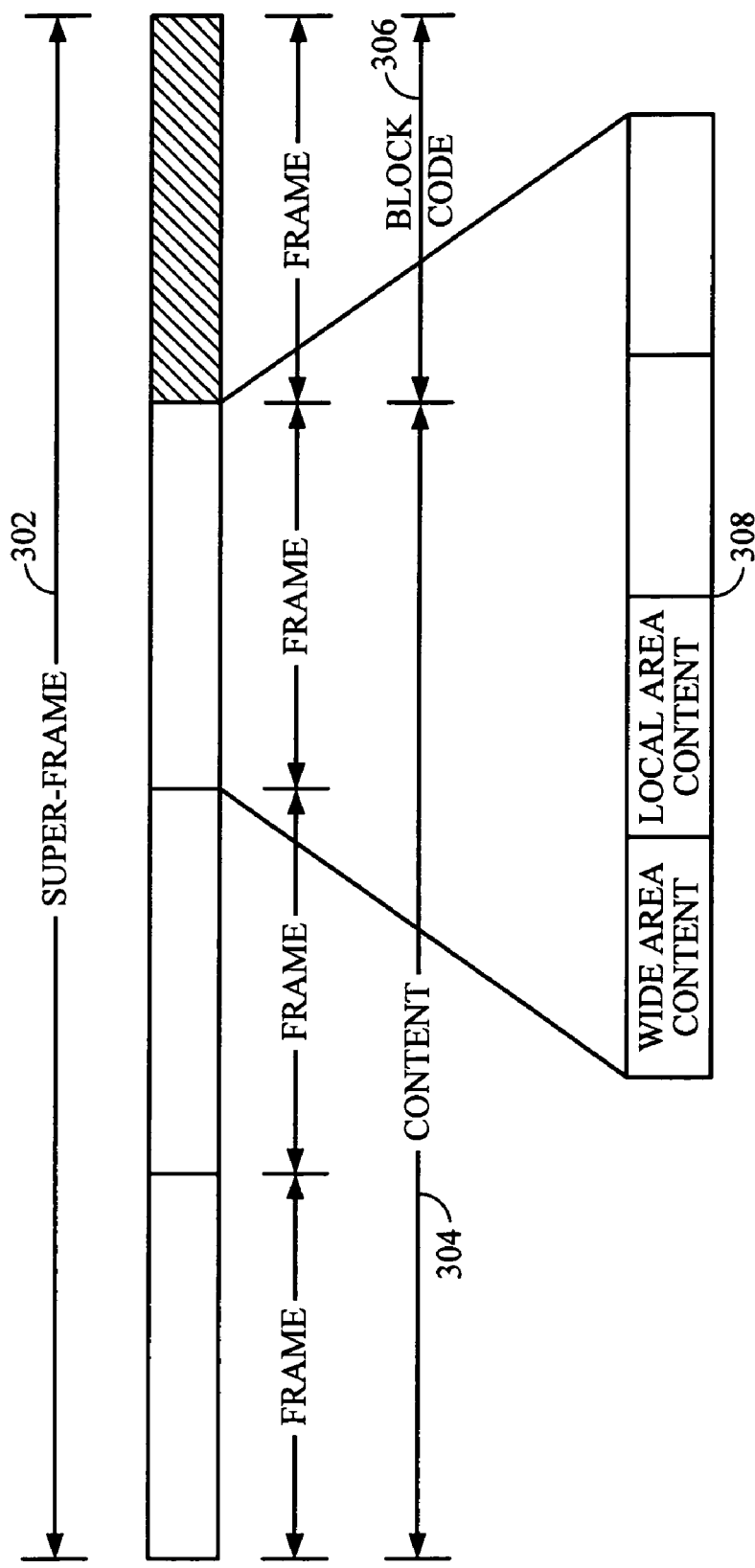
FIG. 3 is a graphical diagram illustrating an example of the data structure for a block of packets protected by a block code.

An example of the data structure for a block of packets protected by a block code is shown in FIG. 3. In this example, the content packet stream is organized into super-frames. Each super-frame 302 includes four frames, with each of the first three frames 304 containing four physical layer packets of content and the last packet 306 containing the parity. The content within each packet belongs to the same logical channel, however, each frame may include packets from different logical channels as shown in the expanded frame 308 which contains wide and local area content packets.

The transport mechanism used to transmit the super-frames (payload) to the transmitter unit 110 may vary depending on the transmission medium, the specific application and the overall design constraints. MPEG-2, for example, is a common transport mechanism for satellite transmission, and therefore, a suitable protocol for many applications involving large scale multimedia broadcasting. In this embodiment, the payload is encapsulated with MPEG-2 transport packets before being transmitted by satellite, or by some other means, to the transmitter unit 110.

The transmitter unit 110 receives the MPEG-2 transport packets from the national operation center 104 and recovers the payload. The payload is then broadcast by the transmitter unit 110 to the wireless subscriber unit 108 using any suitable air interface. In at least one embodiment of the distribution system 100, the air interface is Orthogonal Frequency Division Multiplexing (OFDM), which is well known in the art. OFDM is a modulation technique that allows content to be modulated onto tones or sub-carriers. These tones are spaced apart at precise frequencies to provide orthogonality. The payload is modulated onto a tone by adjusting the tone's phase, amplitude or both. Typically, quadrature phase shift keying (QPSK) or quadrature amplitude modulation (QAM) is used, but other modulation schemes may also be used.

Figure 4:
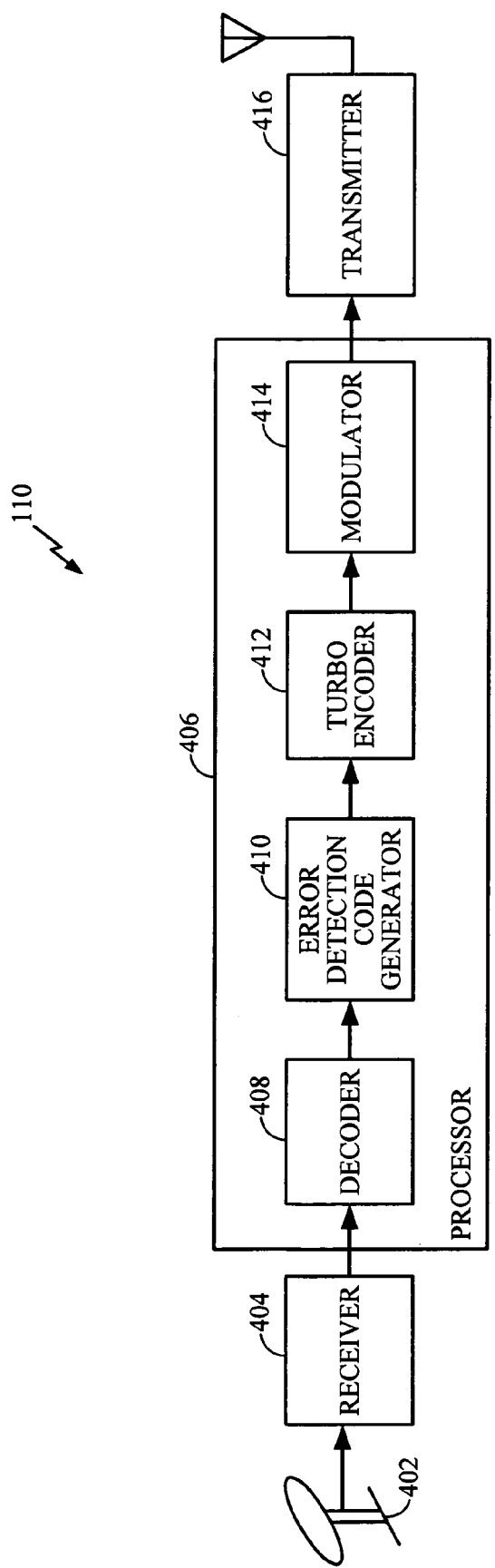
FIG. 4 is a functional block diagram illustrating an example of a transmitter unit.

FIG. 4 is a functional block diagram illustrating an example of the transmitter unit 106. An antenna or satellite dish 402 is configured to receive the satellite transmission from the national operation center 104 (see FIG. 2). The satellite transmission received by the antenna 402 is provided to a receiver 404 where it is amplified, filtered, downconverted to baseband, and digitized. The result is an MPEG-2 transport packet stream that can be provided to a processor 406.

The processor 406 will be described below in terms of its functionality. These functions may be implemented as individual or shared hardware components, as software applications running on one or more hardware components, or any combination thereof. By way of example, the processor 406 may be implemented with a microprocessor that supports multiple software applications. A Digital Signal Processor (DSP) with an embedded software layer may be used to assist the microprocessor by performing part, or all, of one or more processor functions. The processor 406 may include one or more other components, either alone or in combination with a microprocessor and or DSP. These other component may include an Application Specific Integrated Circuit (ASIC), Field Programmable Gate Array (FPGA), Programmable Logic Array (PLA), Programmable Logic Device (PLD), discrete gate or transistor logic, or any combination thereof. Computer-readable media may include one or more storage devices accessible by the various hardware components of the processor 406. Those skilled in the art will recognize the interchangeability of hardware, firmware, and software configurations under these circumstances, and how best to implement the described functionality for each particular application.

The processor 406 includes a decoder 408 that provides a transport layer that is used to recover the payload from the MPEG-2 transport packet stream. The MPEG-2 transport packet stream is an input to the transport layer, and not itself a transport layer protocol. As such, there is no mechanism to ensure reliable delivery of MPEG-2 transport packets from the nation operation center 104 (see FIG. 1) to the transmitter unit 110. Rather, the decoder 408 relies on lower layers to detect and correct MPEG-2 transport packet erasures. An "erasure" refers to a packet that has been either lost or corrupted during transmission between two nodes. These lower layer protocols supporting MPEG-2 transport packets are well known, and therefore, will not be discussed further, except to mention that they are independent of the block codes that form part of each super-frame created by the national operation center 104 (see FIG. 1).

The processor 406 shown in FIG. 4 is configured to provide various signal processing functions to the payload recovered from the MPEG-2 transport packet stream. These signal processing functions may include, among other things, FEC. The FEC may be implemented using turbo codes, convolutional codes, or any other suitable coding scheme. In at least one embodiment of the processor 406, the payload is protected by error detection codes before being provided to a turbo encoder 412. An error detection code generator 410 may be used to generate cyclic redundancy check (CRC) codes, checksums, parity bits, or the like. In the case of a CRC, the error detection code generator 410 treats the bits of each physical layer packet as a binary number, divides it by another fixed binary number, and appends the remainder to the packet as the CRC.

In the embodiment of the processor 406 shown in FIG. 4, the decoder 408 signals the error detection code generator 410 to identify payloads (super-frames) associated with MPEG-2 transport packet erasure that cannot be corrected. The error detection code generator 410 modifies the error detection codes for such payloads to make them undecodable at the wireless subscriber unit 108. In the case of a CRC, for example, the CRC for each packet from a lost or corrupted super-frame is modified in a way that causes the wireless subscriber unit 108 to compute a CRC error. There are numerous ways in which the error detection code generator 410 can modify the CRC. In one embodiment of the error detection code generator 410, each CRC bit could be inverted. Alternatively, an offset could be added to the CRC, the bit-order of the CRC could be reversed, the CRC could be converted to two's compliment, or the CRC could be modified in any other way that causes a CRC error at the wireless subscriber unit 108.

Each packet, protected by an error detection code, is then turbo encoded to produce a stream of code symbols. The code symbols are provided to a modulator 414 where they are blocked together and mapped to coordinates on a signal constellation. The coordinates of each point on the signal constellation is a modulation symbol that represents the quadrature components that are used by a transmitter 416 to modulate the tones or sub-carriers of the OFDM transmission to the wireless subscriber unit 108 (see FIG. 1).

Returning to FIG. 2, the OFDM transmission is received by the wireless subscriber unit 108, converted to the frequency domain using a Discrete Fourier Transform (DFT) or some other means, and de-multiplexed to select content for one or more logical channels. Soft decisions are then made representing an estimate of the modulation symbols that were transmitted by the transmitter unit 110. These modulation symbols are provided to a turbo decoder to recover the payload.

The turbo decoder is a recursive decoder which goes through an iterative process in order to restore error bits. When the error rate is relatively low, the error detection function may allow the wireless subscriber unit 108 to terminate the iterative process early, thereby resulting in reduced power consumption. More specifically, a CRC check function may be performed after each iteration to determine whether the content packets in the super-frame are error free. This is accomplished by recomputing the CRC for each content packet and comparing the recomputed CRCs to the CRCs embedded in the transmission from the transmitter unit 110. If the recomputed CRCs match the transmitted CRCs, then the content packets making up the super-frame are error free and the turbo decoding operation can be terminated early. Otherwise, another iteration and CRC check function is performed.

This process continues until the super-frame packets are error free or the turbo decoder has performed the maximum iterations allowed.

If the turbo decoder is unsuccessful in restoring all the error bits after it goes through the maximum iterations, the parity occupying the last frame of the super-frame can be used in an attempt to correct the remaining errors. However, if the turbo decoder successfully decodes the packets making up the super-frame, the block decoding function can be disabled and the content packets passed to the upper network layers for further processing before being presented to the display and audio circuits on the wireless subscriber unit 108. Additional power savings may be realized every time the block decoder is bypassed.

The use of the CRC check function to terminate the iterative process of the turbo decoder early and disable the block decoder provides an opportunity to provide even greater power savings. Since the codeword occupies the last frame of the super-frame, the CRC check function can be used to force the receiver in the wireless subscriber unit 108 into the sleep mode when the codeword is being transmitted when the turbo decoder successfully decodes the three frames that precede it. In the case where the parity occupies exactly one-quarter of a super-frame, this can result in additional power savings.

Figure 5:
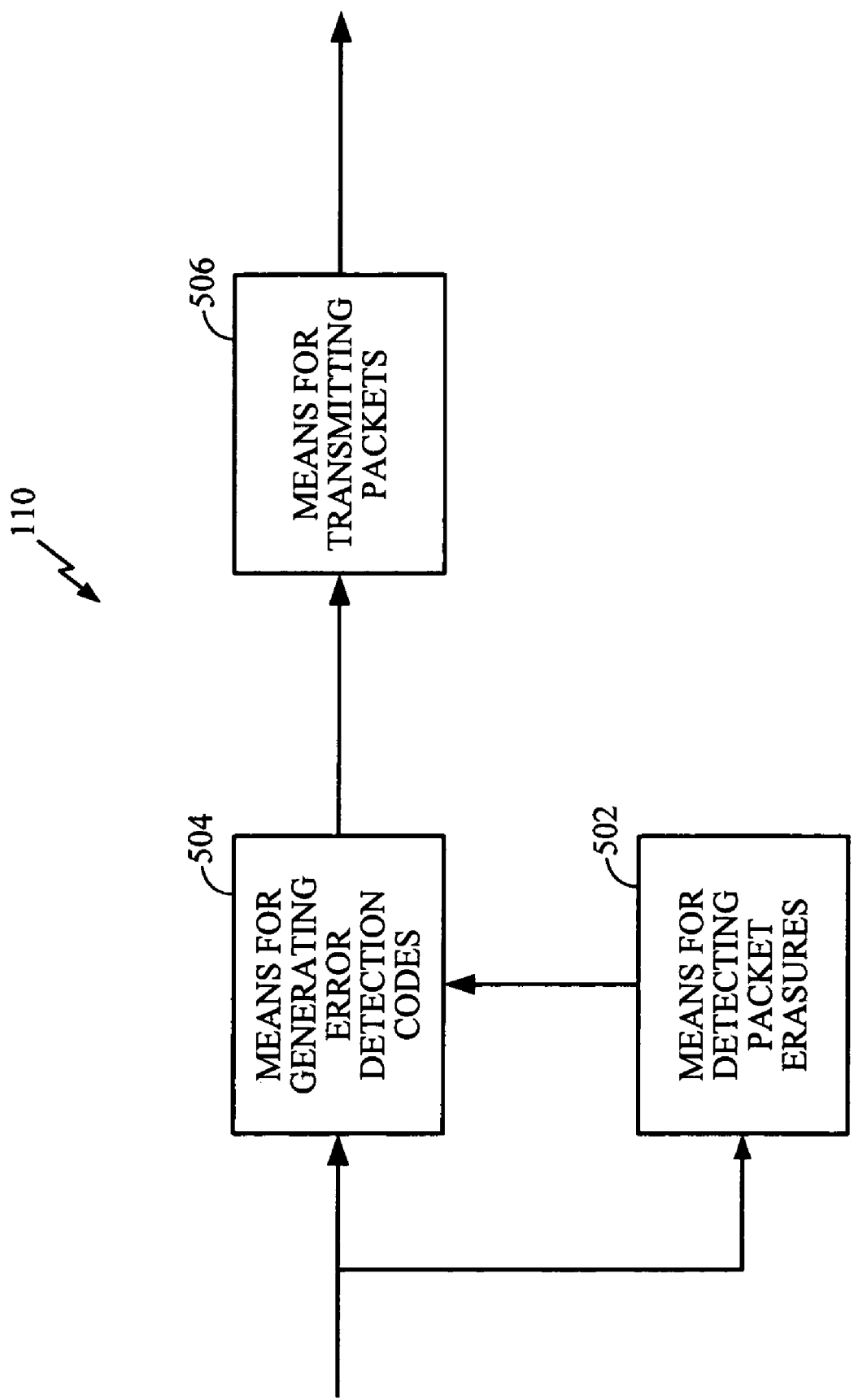
FIG. 5 is a functional block diagram illustrating another aspect of a transmitter unit.

FIG. 5 is a functional block diagram illustrating an example of another aspect of the transmitter unit 106. The transmitter unit 106 includes means for determining whether a plurality of incoming packets include one or more erasures 502. The transmitter unit 106 also includes means for generating an error detection code for each of the packets 504, which modifies the error detection code for each of the erased packets so that the wireless subscriber unit will be able to identify the erased packets. The transmitter unit 106 also includes means for transmitting the packets to the wireless subscriber unit.

The various illustrative logical blocks, modules, circuits, elements, and/or components described in connection with the embodiments disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but is to be accorded the full scope consistent with the language claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A transmitter unit, comprising:
   a decoder configured to determine that a plurality of incoming packets include one or more erasures;
   an error detection code generator coupled to said decoder and configured to generate for each of the incoming packets a corresponding error detection code, and further configured to modify the error detection codes that have been generated for the erased packets so that a receiver unit will be able to identify the erased packets; and
   a transmitter coupled to said error detection decoder and configured to transmit the packets and corresponding error detection codes to the receiver unit.

2. The transmitter unit of claim 1 wherein each of the erased packets is either a lost packet or a corrupted packet, and wherein the decoder is further configured to generate content for each of the lost packets.

3. The transmitter unit of claim 2 wherein the decoder is further configured to generate content for each of the corrupted packets.

4. The transmitter unit of claim 1 wherein the error detection code for each of the packets is computed from the contents of such packet.

5. The transmitter unit of claim 4 wherein the error detection code comprises a CRC, and wherein the error detection code generator is further configured to modify the CRC for each of the erased packets received by the decoder so that receiver unit will compute a CRC error.

6. The transmitter unit of claim 5 wherein the error detection code generator is further configured to modify the CRC for each of the erased packets received by the decoder by inverting each CRC bit.

7. The transmitter unit of claim 5 wherein the error detection code generator is further configured to modify the CRC for each of the erased packets received by the decoder by adding an offset to the CRC.

8. The transmitter unit of claim 5 wherein the error detection code generator is further configured to modify the CRC for each of the erased packets received by the decoder by reversing the order of the CRC bits.

9. The transmitter unit of claim 5 wherein the error detection code generator is further configured to modify the CRC for each of the erased packets received by the decoder by converting the CRC to its two's compliment representation.

10. The transmitter unit of claim 1 wherein the incoming packets includes a block code, and wherein the transmitter unit further comprises an encoder configured to encode the incoming packets and the block code, the transmitter being further configured to transmit the encoded packets and block code to the receiver unit.

11. A transmitter unit, comprising:
a decoder configured to receive multiple channels of packets comprising multimedia content from a content provider, the decoder being further configured to determine that the received packets include one or more erasures;
an error detection code generator coupled to said decoder and configured to generate for each of the received packets a corresponding error detection code, and further configured to modify the error detection codes that have been generated for the erased packets so that wireless subscriber units receiving one or more of the erased packets will be able to identify them as erased packets; and
a transmitter coupled to said error detection decoder and configured to transmit to each of the wireless subscriber units one or more of the channels of packets and corresponding error detection codes.

12. The transmitter unit of claim 11 wherein the error detection code for each of the packets is computed from the contents of such packet.

13. The transmitter unit of claim 12 wherein the error detection code comprises a CRC, and wherein the error detection code generator is further configured to modify the CRC for the erased packets received by the decoder so that the wireless subscriber units receiving one or more of the erased packets will compute a CRC error for each.

14. The transmitter unit of claim 13 wherein the error detection code generator is further configured to modify the CRC for each of the erased packets received by the decoder by inverting each CRC bit.

15. The transmitter unit of claim 13 wherein the error detection code generator is further configured to modify the CRC for each of the erased packets received by the decoder by adding an offset to the CRC.

16. The transmitter unit of claim 13 wherein the error detection code generator is further configured to modify the CRC for each of the erased packets received by the decoder by reversing the order of the CRC bits.

17. The transmitter unit of claim 13 wherein the error detection code generator is further configured to modify the CRC for each of the erased packets received by the decoder by converting the CRC to two's compliment.

18. The transmitter unit of claim 11 wherein the packets received on each channel by the decoder are arranged in blocks, each of the blocks having a block code, and wherein the transmitter unit further comprises an encoder configured to encode each of the blocks of packets with its corresponding block code, the transmitter being further configured to transmit to each of the wireless subscribers units its one or more channels containing encoded blocks of packets its concatenated parity.

19. A method of transmitting packets to a receiving unit, comprising:
determining that a plurality of incoming packets include one or more erasures;
generating for each of the incoming packets a corresponding error detection code;
modifying the error detection codes that have been generated for the erased packets so that a receiver unit will be able to identify the erased packets; and
transmitting the packets and corresponding error detection codes to the receiver unit.

20. The method of claim 19 wherein the error detection code for each of the packets is computed from the contents of such packet.

21. The method of claim 20 wherein the error detection code comprises a CRC, and wherein the CRC for each of the erased packets is modified so that receiver unit will compute a CRC error.

22. The method of claim 20 wherein the CRC for each of the erased packets is modified by inverting each CRC bit.

23. The method of claim 20 wherein the CRC for each of the erased packets is modified by adding an offset to the CRC.

24. The method of claim 20 wherein the CRC for each of the erased packets is modified by reversing the order of the CRC bits.

25. The method of claim 20 wherein the CRC for each of the erased packets is modified by converting the CRC to two's compliment.

26. The method of claim 19 wherein the incoming packets includes a block code, the method further comprising encoding the incoming packets and parity, and wherein the encoded packets and its concatenated parity are transmitted to the receiver unit.

27. A transmitter unit, comprising:
means for determining that a plurality of incoming packets include one or more erasures;
means for generating for each of the incoming packets a corresponding error detection code, and for modifying the error detection codes that have been generated for the erased packets so that a receiver unit will be able to identify the erased packets; and
means for transmitting the packets and corresponding error detection codes to the receiver unit.

28. A computer program product for supporting packet transmission, comprising:
a computer-readable medium comprising:
code for causing at least one data processor to determine that a plurality of incoming packets include one or more erasures;
code for causing the at least one data processor to generate for each of the incoming packets a corresponding error detection code; and
code for causing the at least one data processor to modify the error detection codes that have been generated for the erased packets so that a receiver unit that receives transmission of the packets and corresponding error detection codes will be able to identify the erased packets.

* * * * *

UNITED STATES PATENT AND TRADEMARK OFFICE
CERTIFICATE OF CORRECTION

PATENT NO. : 7,613,256 B2 Page 1 of 1
APPLICATION NO. : 11/398204
DATED : November 3, 2009
INVENTOR(S) : van Veen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 787 days.

Signed and Sealed this

Fourteenth Day of December, 2010

David J. Kappos
*Director of the United States Patent and Trademark Office*